(12) United States Patent
Sap

(10) Patent No.: US 9,932,062 B2
(45) Date of Patent: Apr. 3, 2018

(54) STEERING COLUMN

(71) Applicant: AGCO SA, Hesston, KS (US)

(72) Inventor: Bruno Sap, Haute Epine (FR)

(73) Assignee: AGCO Corporation, Duluth, GA (US)

( * ) Notice: Subject to any disclaimer, the term of this patent is extended or adjusted under 35 U.S.C. 154(b) by 15 days.

(21) Appl. No.: 15/108,364

(22) PCT Filed: Dec. 17, 2014

(86) PCT No.: PCT/EP2014/078313
§ 371 (c)(1),
(2) Date: Jun. 27, 2016

(87) PCT Pub. No.: WO2015/101504
PCT Pub. Date: Jul. 9, 2015

(65) Prior Publication Data
US 2016/0325775 A1 Nov. 10, 2016

(30) Foreign Application Priority Data
Dec. 31, 2013 (GB) .................................. 1323165.9

(51) Int. Cl.
B62D 1/189 (2006.01)
B60T 7/06 (2006.01)
(Continued)

(52) U.S. Cl.
CPC ............... *B62D 1/189* (2013.01); *B60T 7/04* (2013.01); *B60T 7/06* (2013.01); *B60T 11/18* (2013.01);
(Continued)

(58) Field of Classification Search
CPC .......... B62D 1/189; B62D 1/18; B62D 1/183; B62D 1/184; B62D 1/185; B62D 1/187; B62D 49/0692; B60T 11/18; B60T 7/06; B60T 7/04; G05G 1/44; G05G 13/00; B60W 2540/12; B60K 2350/407; B60G 2200/221
(Continued)

(56) References Cited

U.S. PATENT DOCUMENTS 3,520,209 A * 7/1970 Cescone ................. B62D 1/163
180/78
3,691,866 A * 9/1972 Berkes ................... B62D 1/184
16/332

(Continued)

FOREIGN PATENT DOCUMENTS

DE 19624686 A1 1/1997
DE 19920848 A1 5/2000
(Continued)

OTHER PUBLICATIONS

UK Intellectual Property Office, International Search Report for Priority Application No. GB1323165.9, dated Jul. 30, 2014.
(Continued)

*Primary Examiner* — Keith J Frisby

(57) ABSTRACT

A steering column assembly for a vehicle, the assembly having a steering wheel for steering the vehicle, a brake pedal for operating the vehicle brakes, wherein the steering wheel and a pivot for the brake pedal are carried on a four bar mechanism mounted on the vehicle.

13 Claims, 3 Drawing Sheets

(51) Int. Cl.
    *G05G 1/44*     (2008.04)
    *B60T 7/04*     (2006.01)
    *B60T 11/18*     (2006.01)
    *B62D 1/04*     (2006.01)
    *B62D 49/06*     (2006.01)
    *B62D 3/14*     (2006.01)

(52) U.S. Cl.
    CPC .......... *B62D 1/04* (2013.01); *B60W 2540/12* (2013.01); *B62D 3/14* (2013.01); *B62D 49/0692* (2013.01); *G05G 1/44* (2013.01)

(58) Field of Classification Search
    USPC ..... 74/493; 280/775, 88; 180/326, 333, 334, 180/78
    See application file for complete search history.

(56) References Cited

U.S. PATENT DOCUMENTS

| | | | | |
|---|---|---|---|---|
| 3,737,003 | A * | 6/1973 | Beals | B60K 37/00 180/78 |
| 3,800,903 | A | 4/1974 | Beals et al. | |
| 4,209,074 | A | 6/1980 | York | |
| 4,682,787 | A * | 7/1987 | Ruhter | B62D 1/18 180/334 |
| 4,966,391 | A * | 10/1990 | Sobodos | A63G 25/00 280/777 |
| 5,632,353 | A * | 5/1997 | Kimberley | B60K 35/00 180/326 |
| 5,666,857 | A * | 9/1997 | Sebazco | B60T 7/02 180/333 |
| 6,685,224 | B2 * | 2/2004 | Pardonnet | B62D 1/18 280/775 |
| 7,455,319 | B2 * | 11/2008 | Haglund | B62D 1/181 280/775 |
| 8,220,834 | B2 * | 7/2012 | Battistella | B62D 1/195 280/777 |
| 8,726,757 | B2 * | 5/2014 | Barroso | B62D 1/183 74/493 |
| 2006/0087154 | A1 * | 4/2006 | Schlafer | B60N 3/063 296/190.01 |

FOREIGN PATENT DOCUMENTS

| | | | |
|---|---|---|---|
| EP | 0050929 | A1 | 5/1982 |
| EP | 1179461 | A2 | 2/2002 |
| FR | 2135568 | A1 | 12/1972 |
| JP | 61094829 | A * | 5/1986 ............ B62D 1/18 |
| JP | 2008149942 | A | 7/2008 |
| WO | 9015747 | A | 12/1990 |

OTHER PUBLICATIONS

European Patent Office, International Search Report for International Patent No. PCT/EP2014/078313, dated Mar. 31, 2015.

* cited by examiner

STEERING COLUMN

BACKGROUND OF THE INVENTION

Field of Invention

The present invention relates to vehicle steering columns and in particular, but not exclusively, to a combined steering column and pedal assembly for a tractor.

Description of Related Art

It is necessary to provide a comfortable driving environment within a tractor cab. The cab must therefore accommodate a range of operators of differing stature. This necessitates a degree of flexibility in the positioning of the control surfaces. Primary amongst these are the distance between the seat and the steering wheel and the distance between the seat and the pedals.

Traditionally this flexibility has been provided by a seat which can be moved forwards and backwards. However this alters the position of the drivers head which may then not be in the optimum position for visibility. Furthermore, moving the seat can affect the proximity of the driver to implement controls and supplementary vehicle controls.

An attempt to solve this problem was to attach the brake pedal pivots to the steering column and allow the entire steering column and pedals to slide fore and aft. Whilst this overcame some of the problems above it presented new problems. Principle amongst these was the requirement to move the point of attachment of the brake cylinder from the vehicle chassis onto the moveable steering column. This added complexity and cost to the steering column since the point attachment of the brake cylinder is safety critical and can carry significant load particularly under emergency braking.

It is also known to move the pedal relative to a fixed cylinder position but this can lead to an inconsistent brake pedal feel between positions.

OVERVIEW OF THE INVENTION

It is an objective of the present invention to at least mitigate one or more of the above problems.

According to the invention there is provided a steering column assembly for a vehicle, the assembly having
a steering wheel for steering the vehicle,
a brake pedal for operating the vehicle brakes,
wherein the steering wheel and a pivot for the brake pedal are carried on a four bar mechanism mounted on the vehicle.

Advantageously, this allows the position of the steering wheel and pedal to be readily moved without the need for a sliding mechanism.

Preferably, the assembly has a brake cylinder mounted directly on the chassis, and a connecting rod arranged between the brake cylinder and the pedal, wherein the connecting rod acts in parallel with the four bar mechanism.

Advantageously, this feature of the invention allows the brake pedal to move in unison with the steering wheel whilst the position of the brake pedal relative to the steering wheel remains largely constant. This ensures a consistent pedal feel between positions. Furthermore the fact that the brake cylinder remains in a constant position and fixed to the chassis greatly simplifies the assembly and increases its reliability. Preferably, the connecting rod is pivotally connected to the brake cylinder and to the brake pedal.

Preferably, the steering wheel is coupled to a sheering shaft, wherein the steering shaft is supported on the four bar mechanism. Preferably, the steering shaft is connected to a hydraulic steering unit provided on the vehicle.

Preferably, the four bar mechanism comprises a double rocker type mechanism.

Preferably, the double rocker type mechanism comprises first and second upright members pivotably mounted on the vehicle at a lower end of said upright members, and a cross member pivotably attached between the distal upper ends of said upright members.

In this case, the fourth bar of the four bar mechanism is effectively formed by the vehicle itself.

Preferably, the steering wheel is carried on the cross member. Preferably, the steering wheel is pivotably carried on the cross member.

Preferably, the pivot for the brake pedal is carried on the cross member.

Preferably, the four bar mechanism is arranged in a substantially vertical alignment.

In one aspect, the four bar mechanism is mounted on a floor of a vehicle cab.

Preferably, the steering column assembly further comprises a locking assembly arranged to releasably lock the four bar mechanism in position.

Preferably, the four bar mechanism is substantially arranged in a lengthwise direction of the vehicle, such that the steering column assembly may be adjusted along the vertical axis and along the lengthwise axis of the vehicle.

There is further provided a vehicle, preferably an agricultural tractor, having a steering column assembly as described above.

BRIEF DESCRIPTION OF THE DRAWINGS

The invention will now be described, by way of example only, and with reference to the following drawings, in which.

DETAILED DESCRIPTION OF THE INVENTION

Figure 1:
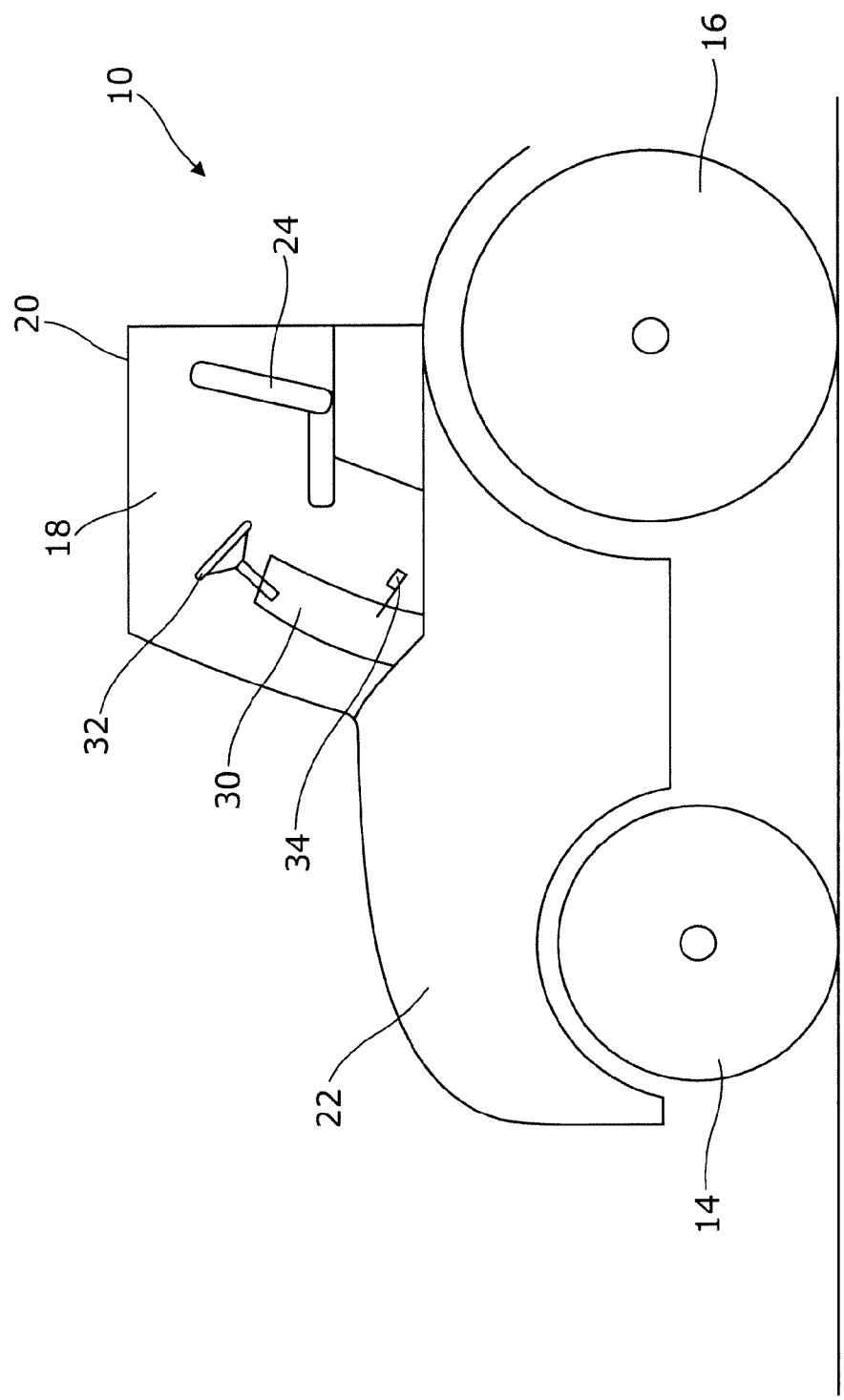
FIG. 1 is a schematic side view of a tractor showing the general location of the steering column within the cabin.

FIG. 1 shows a tractor 10 having front wheels 14, rear wheels 16, a cab 18, roof 20 and a hood 22. Within the cab 18 is a seat 24 and a steering column 30. The steering column 30 supports a steering wheel 32 and brake pedal 34. The other pedals and controls are not shown for clarity.

Figure 2:
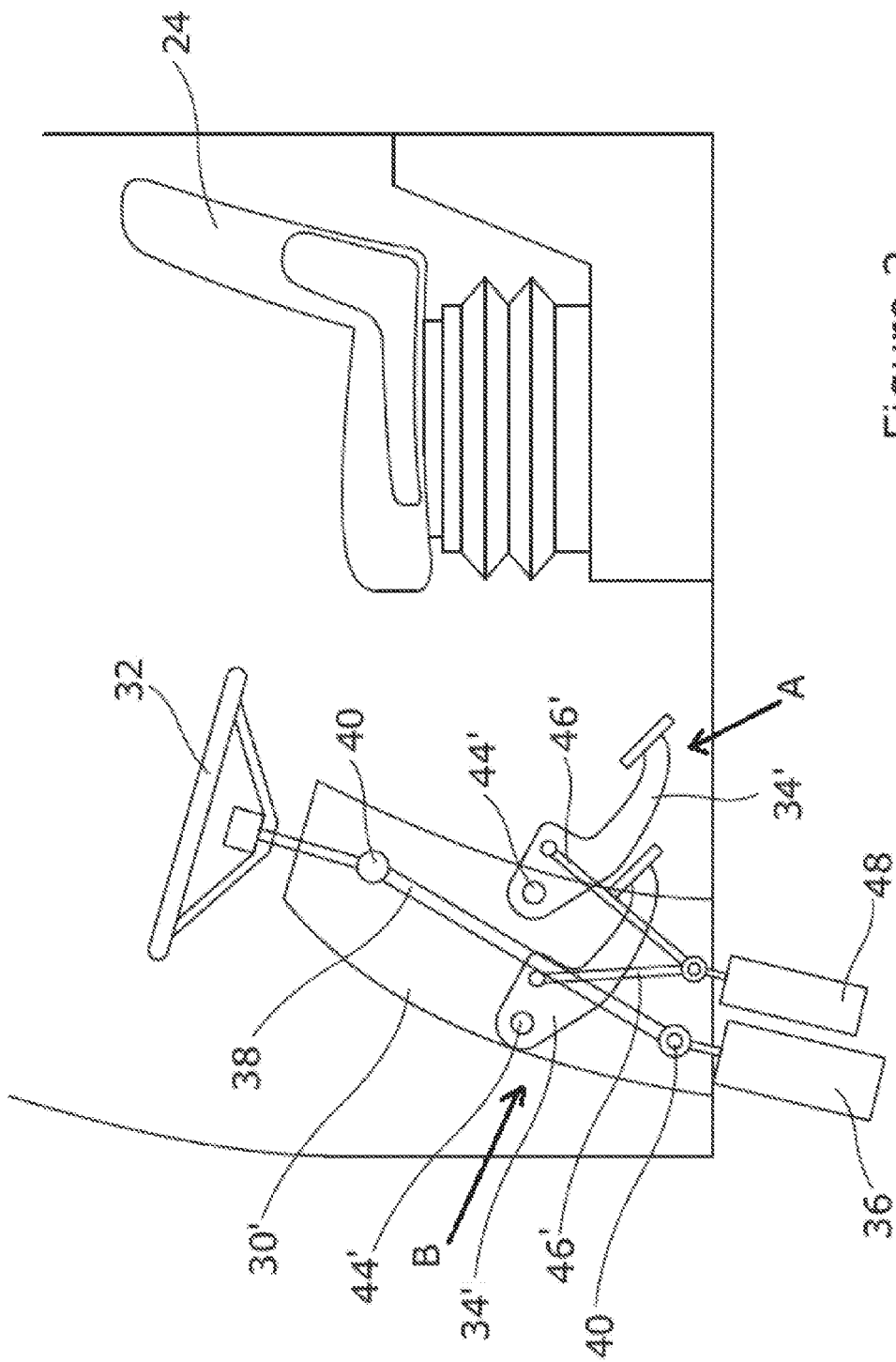
FIG. 2 is a schematic side view of a prior art steering column.

Turning now to FIG. 2 a prior art steering column 30' is shown in greater detail. The steering wheel 32 operates a hydraulic steering unit 36 via shaft 38 supported by two universal joints 40. The brake pedal 34' is shown in a first position A which corresponds to a first position of the steering column 34' and a second position B which corresponds to a second position (not shown) of the steering column 34'. Pedal 34' is carried on a pivot 44' and operates a connecting rod 46' which is connected to a brake cylinder 48 at its lower end. It can be seen that in moving the steering column 34' from its first to second position the angle of the connecting rod 46' changes substantially which alters the load applied to the brake cylinder 48 for a given load applied to the pedal 34' by the operator. This leads to an inconsistent brake feel.

Figure 3:
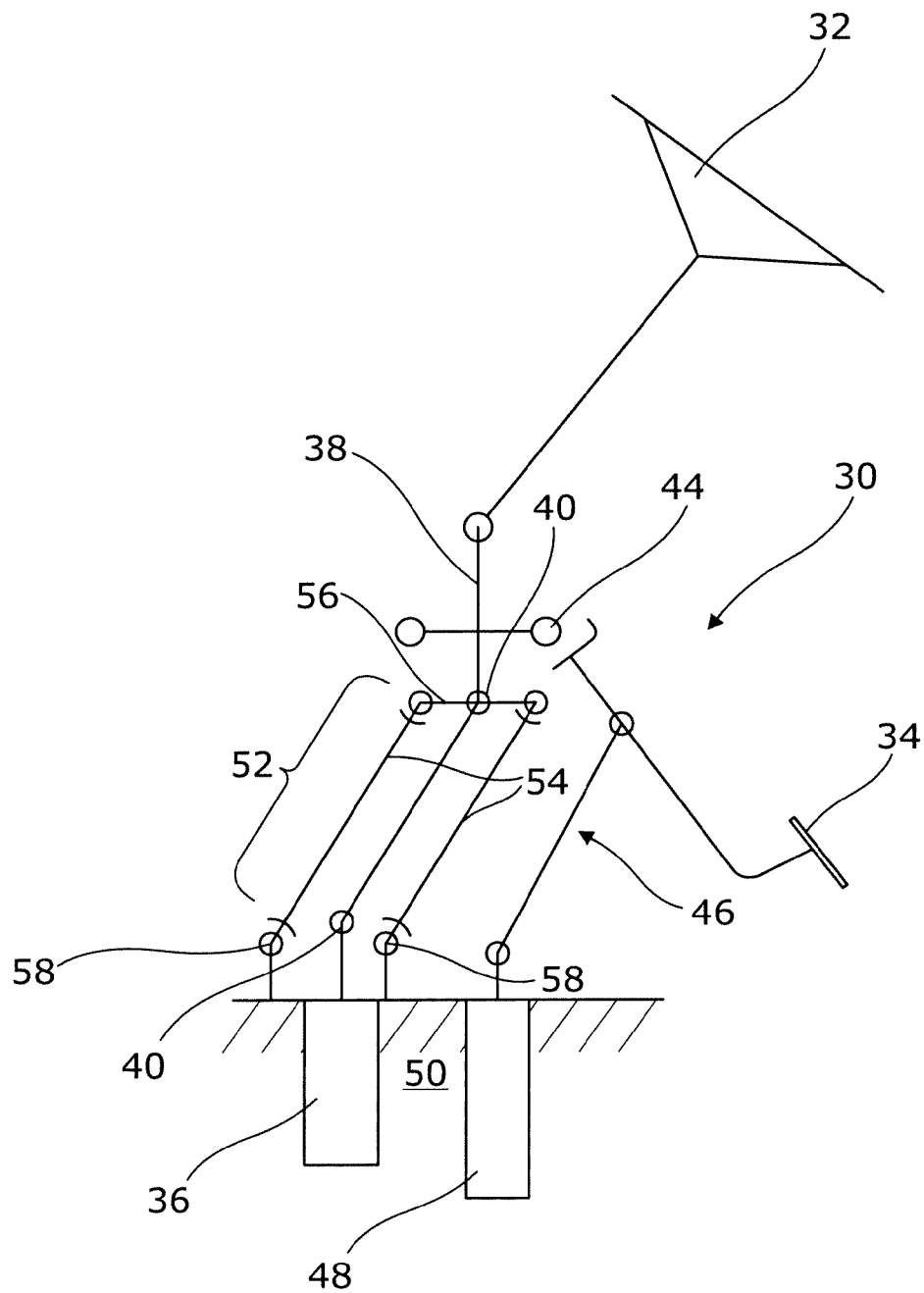
FIG. 3 is a schematic side view of the steering column of the present invention.

Turning now to FIG. 3, the steering column 30 of the present invention is intended as a replacement for the known column of FIG. 2. The steering column 30 has a steering wheel 32 and a brake pedal 34. The brake pedal 34 is linked to the brake cylinder 48 by connecting rod 46. The brake cylinder 48 is fixed to the tractor chassis indicated generally at 50. The brake pedal 34 is supported on the steering column by pivot 44. The pivot 44 and steering shaft 38 are supported by a four bar mechanism indicated generally at 52. The mechanism has two upright members 54 and a cross member 56. The lower ends of the upright members 54 are pivotally attached to the chassis 50 via pivots 58. The steering wheel 32 is connected to the hydraulic steering unit 36 by steering shaft 38 acting through universal joints 40.

In use the position of the steering column 30 can be altered by the four bar mechanism 52 rotating on its pivots 58. This has the effect of moving the steering wheel 32 laterally as viewed in FIG. 3. Furthermore the connecting rod 46 is caused to move in parallel with the upright members of the four bar mechanism. This ensures a more consistent pedal feel as the position of the steering column varies.

The four bar mechanism 52 is arranged to be substantially in line with the longitudinal direction of the tractor. Such an alignment allows for the steering column 30 to be adjusted along the longitudinal and vertical axes of the tractor.

It will be understood that the steering column may be provided with a locking mechanism (not shown), such that the steering column may be releasably locked in position, after adjustment.

The invention is not limited to the embodiment described herein, and may be modified or adapted without departing from the scope of the present invention.

The invention claimed is:

1. A steering column assembly for a vehicle, the assembly comprising:
   a steering wheel for steering the vehicle;
   a brake pedal for operating the vehicle brakes;
   a brake cylinder mounted directly on a chassis; and
   a connecting rod arranged between the brake cylinder and the pedal;
   wherein the steering wheel and a pivot for the brake pedal are carried on a four bar mechanism mounted on the vehicle and the connecting rod acts in parallel with the four bar mechanism.

2. The steering column assembly of claim 1, wherein the connecting rod is pivotably connected to the brake cylinder and to the brake pedal.

3. The steering column assembly of claim 1, wherein the steering wheel is coupled to a sheering shaft, and wherein the steering shaft is supported on the four bar mechanism.

4. The steering column assembly of claim 3, wherein the steering shaft is connected to a hydraulic steering unit provided on the vehicle.

5. The steering column assembly of claim 1, wherein the four bar mechanism comprises a double rocker mechanism.

6. The steering column assembly of claim 5, wherein the double rocker mechanism comprises first and second upright members pivotably mounted on the vehicle at a lower end of said upright members, and a cross member pivotably attached between the distal upper ends of said upright members.

7. The steering column assembly of claim 6, wherein the steering wheel is carried on the cross member.

8. The steering column assembly of claim 7, wherein the steering wheel is pivotably mounted to the cross member.

9. The steering column assembly of claim 6, wherein the pivot for the brake pedal is carried on the cross member.

10. The steering column assembly of claim 1, wherein the four bar mechanism is arranged in a substantially vertical alignment.

11. The steering column assembly of claim 1, wherein the four bar mechanism is mounted on a floor of a vehicle cab.

12. The steering column assembly of claim 1, wherein the four bar mechanism is substantially arranged in a lengthwise direction of the vehicle, such that the steering column assembly may be adjusted along the vertical axis and along the lengthwise axis of the vehicle.

13. An agricultural tractor, having a steering column assembly as claimed in claim 1.

* * * * *